(12) United States Patent
Harrang et al.

(10) Patent No.: US 9,172,643 B2
(45) Date of Patent: Oct. 27, 2015

(54) METHOD AND SYSTEM FOR COOPERATIVE CONGESTION DETECTION IN CELLULAR NETWORKS

(71) Applicant: Opanga Networks, Inc., Seattle, WA (US)

(72) Inventors: Jeffrey P. Harrang, Seattle, WA (US); David Gibbons, Seattle, WA (US); John M. Burnette, Seattle, WA (US)

(73) Assignee: Opanga Networks, Inc., Seattle, WA (US)

( * ) Notice: Subject to any disclaimer, the term of this patent is extended or adjusted under 35 U.S.C. 154(b) by 60 days.

(21) Appl. No.: 13/843,875

(22) Filed: Mar. 15, 2013

(65) Prior Publication Data

US 2014/0119184 A1 May 1, 2014

Related U.S. Application Data

(60) Provisional application No. 61/718,526, filed on Oct. 25, 2012.

(51) Int. Cl.
*H04L 12/28* (2006.01)
*H04L 12/801* (2013.01)

(52) U.S. Cl.
CPC ............... *H04L 47/10* (2013.01); *H04L 12/28* (2013.01)

(58) Field of Classification Search
CPC ...... H04L 47/11; H04W 28/04; H04W 28/06; H04W 28/22
See application file for complete search history.

(56) References Cited

U.S. PATENT DOCUMENTS

| | | | |
|---|---|---|---|
| 2005/0144049 A1 | 6/2005 | Kuzunuki et al. | |
| 2006/0176810 A1 | 8/2006 | Kekki | |
| 2008/0172475 A1 | 7/2008 | Okamura | |
| 2010/0274871 A1 | 10/2010 | Harrang et al. | |
| 2011/0222406 A1* | 9/2011 | Persson et al. | 370/236 |
| 2011/0267948 A1* | 11/2011 | Koc et al. | 370/235 |
| 2013/0095764 A1* | 4/2013 | Rodbro et al. | 455/67.11 |
| 2013/0194937 A1* | 8/2013 | Sridhar et al. | 370/252 |

FOREIGN PATENT DOCUMENTS

KR    10-2007-0104102 A    10/2007

OTHER PUBLICATIONS

International Search Report and Written Opinion for PCT/US2013/065781, filed Oct. 18, 2013.

* cited by examiner

*Primary Examiner* — David Oveissi

(57) ABSTRACT

Congestion information is determined based on a file segment transferred to one of user terminals. The congestion information is available to a server or controller communicatively linked with a plurality of user terminals. The congestion information is shared with other user terminals that share a bottleneck link.

19 Claims, 9 Drawing Sheets

METHOD AND SYSTEM FOR COOPERATIVE CONGESTION DETECTION IN CELLULAR NETWORKS

CROSS REFERENCE TO RELATED APPLICATIONS

This application claims the benefit of U.S. Provisional Patent Application No. 61/718,526, filed on Oct. 25, 2012, which is incorporated herein by reference.

BACKGROUND

Embodiments relate to the field of computer networks and communications over computer networks, including communications over wireless networks.

Many computer networks in existence today communicate through the transfer of data. Some examples include networks that can function independently (e.g., as Local Area Networks or LANs) or collectively as part of a group of interconnected networks (e.g., Wide Area Networks or WANs), such as the World Wide Web. Some of these networks include technologies that facilitate relatively fast, high data-rate transmissions (e.g., wired, fiber-optic, cable, and Digital Subscriber Line networks). Others facilitate slower data-rate transmissions (e.g., 3G cellular networks).

Mobile broadband services are becoming very popular in modern society. These services can provide a way for individuals having wireless communications devices (e.g., a cellular phone or tablet) to stay connected to the Internet while operating within and roaming between various wireless coverage areas. A concurrent trend is the huge increase in applications and media content distribution services that can facilitate the delivery of large, burdensome media content files to or from user equipment. Large media content file transfers have the signature feature of consuming significant amounts of network resources (e.g., channel bandwidth) over extended periods of time. Methods of enabling and making this particular data type delivery more efficient are important to end users and service providers alike. The processes facilitating more efficient media content delivery are particularly relevant for wireless networks that have limited bandwidth resources.

Most wireless networks operate using shared communications channels where concurrent, competing requests for channel access is commonplace. In these networks, data transfers can be slowed or degraded during periods of network channel congestion. Congestion can occur if the demand for a shared channel's bandwidth resources nears or exceeds the channel's capacity. Under these circumstances, the active users of the shared channel may come into conflict as each user attempts to complete individual data throughputs. To solve this problem, users can revise their requests so that the shared network channel can successfully deliver all requests in a timely manner For example, in a well-known strategy, users reduce their individual traffic using a fair-share policy. Many other prioritization schemes exist, but in existing methods the users of the congested shared network resource must first become aware that congestion is present before users can take corrective action to mitigate the congestion.

Congestion awareness by a user of a shared channel or link may be achieved in a variety of ways. In an example, end user terminals could individually operate packet data protocols with a congestion detection mechanism and develop congestion metrics. For instance, one transport-layer packet data protocol is the transport control protocol (TCP). TCP is also known by names of its many implementation variants such as TCP-Reno, TCP-Vegas and CUBIC. Other packet data protocols with congestion detection capability exist such as SCTP. In using TCP or other similar protocols, sending and receiving terminals interconnected by a network typically conduct periodic measurements of the network by transporting data over the network and measuring delivery performance of the data. Thus, the periodic measurements taken in accordance to these protocols also present a traffic load to a network. Accordingly, if many end user terminals attempt to detect congestion in this manner, the aggregate burden to the network traffic exacerbates any congestion that may already be present. Sending and receiving terminal pairs do not share congestion state information with other terminals of the shared channel or link or even with separate transport layer data sessions operating using the same sending and receiving terminals.

Furthermore, congestion detection and control is often assigned to lower protocol layers such as TCP, while upper application protocol layers and application programming interfaces typically do not have access to the congestion status of the network. Without access to congestion information upper application layers and application programming have difficulty reacting to or mitigating the congestion.

BRIEF SUMMARY OF THE INVENTION

Embodiments relate to the field of computer networks and communications over computer networks, including communications over wireless networks. In an embodiment, congestion information is determined based on a file segment transferred to one of user terminals. The congestion information is available to a server or controller communicatively linked with a plurality of user terminals. The congestion information is shared with other user terminals that share a bottleneck link.

According to an embodiment of the present invention, a networked system comprises a sending system having a processor and a memory; first and second receiving systems, each system having a processor and a memory; a communication network having a plurality of network resources that couples the sending system, the first and second receiving systems in the communication network; and a non-transitory computer readable medium with stored computer executable instructions. When the instructions are executed by the processor they perform a method including sending a file segment to the first receiving system from the sending system, the file segment being a portion of a data file being transmitted to the first receiving system; determining congestion information of the communication network based on a transfer of the file segment; and communicating the congestion information to the second receiving system. In some embodiments, the first and second receiving systems may be wireless devices that are communicatively lined with the wireless network, and the non-transitory computer readable medium may be located in the sending or receiving systems.

In an embodiment, congestion information is measured by a resource that is associated with a lower communications layer.

In an embodiment, congestion information is communicated to the second receiving system by providing the congestion information in an application layer of a packet transmitted to the second receiving system.

In an embodiment, the congestion information includes congestion status, or congestion metrics, or both. In another embodiment, the congestion status information is measured by the first receiving system or the sending system. In yet another embodiment, when the instructions are executed by the processor, the method may additionally include calculating the congestion metrics using the congestion status, and communicating the metrics to the second receiving system by providing the congestion information in an application layer of a packet transmitted to the second receiving system.

In an embodiment, when the instructions are executed by the processor, the method may additionally include determining a bottleneck link in the communication network based on the congestion information, the bottleneck link being associated with one of the network resources in the end-to-end communication network links between the sender and the receiving systems; identifying receiving systems sharing the bottleneck link; and communicating the congestion information to the receiving systems sharing the bottleneck link, the second receiving system being one of the systems identified as sharing the bottleneck link. In another embodiment, the sending system identifies the receiving systems sharing the bottleneck link and communicates the congestion information to the systems sharing the bottleneck link.

In an embodiment, when the instructions are executed by the processor, the method may additionally include communicating the congestion information to a congestion management system of the network system, where the congestion management system communicates the congestion information to the second receiving system.

According to an embodiment of the present invention, a cooperative congestion detection method in a networked system having a sending system and first and second receiving systems comprises sending a file segment to the first receiving system from the sending system, the file segment being a portion of a data file being transmitted to the first receiving system; determining congestion information of the network system based on a transfer of the file segment; and communicating the congestion information to the second receiving system.

In an embodiment of a cooperative congestion detection method, the network system includes a wireless network, and the first and second receiving systems may be wireless devices communicatively linked with the wireless network. In another embodiment, congestion information can be measured by a resource that is associated with a lower communications layer. In a further embodiment, the congestion information is communicated to the second receiving system by providing the congestion information in an application layer of a packet transmitted to the second receiving system.

In an embodiment of a cooperative congestion detection method, congestion information includes congestion status, or congestion metrics, or both. In another embodiment, congestion status information is measured by the first receiving system or the sending system. In a further embodiment, the method further comprises calculating the congestion metrics using the congestion status. The congestion information is communicated to the second receiving system by providing the congestion information in an application layer of a packet transmitted to the second receiving system.

In an embodiment of a cooperative congestion detection method, the method further comprises determining a bottleneck link in the end-to-end network system links between the sender and the receiving systems based on the congestion information; identifying receiving systems sharing the bottleneck link; and communicating the congestion information to the systems sharing the bottleneck link, the second receiving system being one of the systems identified as sharing the bottleneck link. In another embodiment, the sending system identifies the receiving systems sharing the bottleneck link and communicates the congestion information to the systems sharing the bottleneck link.

In an embodiment of a cooperative congestion detection method, the method further comprises communicating the congestion information to a congestion management system of the network system. The congestion management system may communicate the congestion information to the second receiving system.

DETAILED DESCRIPTION OF THE INVENTION

Figure 1:
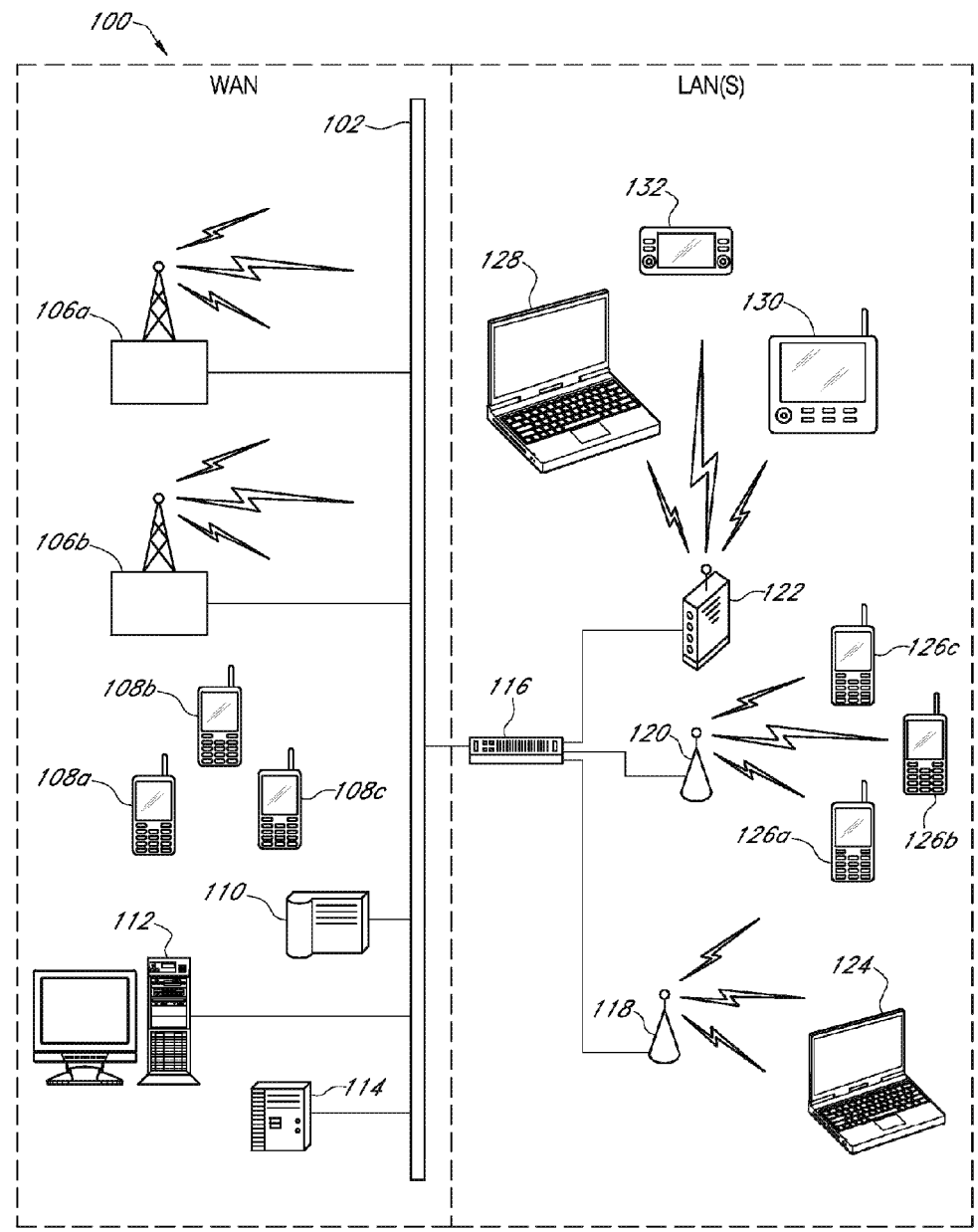
FIG. 1 illustrates a networked computing system including various wireline and wireless computing devices according to some embodiments.

FIG. 1 illustrates a networked computing system 100 including various wireline and wireless computing devices that may be utilized to implement any of the network traffic and radio communications quality monitoring or data content transfer optimization processes associated with various embodiments of the present invention. The specific network configuration shown in FIG. 1 is intended to provide an example of a high-level computing system capable of facilitating various network communications processes of embodiments disclosed herein. Network configuration and topology changes could be made to the networked computing system 100 of FIG. 1, without departing from the spirit and scope of the present disclosure.

In an embodiment, the networked computing system 100 includes a group of service provider devices; a data communications network 102; a variety of remote user equipment; one or more devices to facilitate data communications; and one or more local user equipment. In addition to the components described above, the networked computing system 100 may include other types of network components according to various implementations.

A group of service provider devices 110, 112, 114 and 116 (SPDs) may include server computers (e.g., network controller devices) or any other common network device, such as routers, gateways, or switch devices, which can support network resource allocation and/or digital data communications services to various user equipment (e.g., any of terminal devices 108a-108c, 124, 126a-126c, 128, 130 and 132) within the networked computing system 100. A data communications network 102 includes Wide Area Network (WAN), Local Area Networks (LANs), and portions thereof.

A variety of remote user equipment may include cellular phone (or mobile devices) 108a-108c along with any other variety of portable wireless computing device well known in the art (e.g., cellular phones, smartphones, tablets, computers, netbooks, electronic book devices, handheld gaming units, personal music players, video recorders, WI-FI™ devices, etc.). The remote user equipment may be connected to the data communications network 102 utilizing one or more wireless base stations 106a-106b, or any other common wireless or wireline network communications technology.

One or more network gateways, routers, or switch devices 116 facilitate data communications processes, within the LANs, and between the LANs and the WAN of the data communications network 102.

One or more user equipment 108a-108c, 124, 126a-126c, 128, 130 and 132 can be wirelessly connected to one or more local or remote network base stations 106a-106b, 118, 120, and 122, or optionally directly or indirectly connected to a backhaul portion of the network (e.g., to data communications network 102) via any common wireline or wireless communications technology. The user equipment includes laptop computers 124 and 128, wireless mobile devices (or phones) 108a-108c, 126a-126c, electronic book devices 130, handheld gaming units 132, personal music players, video recorders, Wi-Fi devices, or the like.

In an embodiment, any of the SPDs 110, 112, and 114 (including any of the network base stations 106a, 106b, 118, 120, and 122), the router, gateway, or switch device(s) 116, or any of the remote or local user equipment 108a-108c, 124, 126a-126c, 128, 130, and 132, may be configured to run any known operating system, including but not limited to, MICROSOFT®, WINDOWS®, MAC OS®, LINUX®, UNIX®, GOOGLE® CHROME®, or any common mobile operating system, including APPLE® IOS®, WINDOWS® MOBILE®, MOBILE LINUX®, GOOGLE® ANDROID®, etc.

In an embodiment, any of the SPDs 106a, 106b, 110, 112, 114, 116, 118, 120, and 122 may employ any number of common server, desktop, laptop, and personal computing devices. In an embodiment, the user equipment 108a-108c, 124, 126a-126c, 128, 130, and 132 may include any combination of common mobile computing devices (e.g., laptop computers, netbook computers, cellular phones, PDAs, handheld gaming units, electronic book devices, personal music players, video recorders, etc.), having wireless communications capabilities employing any common wireless data commutations technology, including, but not limited to: WI-FI™, WIMAX™, GSM™, UMTS™, LTE™, LTE Advanced™ etc.

In an embodiment, the LANs or the WAN portions of the data communications network 102 may employ any of the following common communications technologies: optical fiber, coaxial cable, twisted pair cable, Ethernet cable, and powerline cable, along with any wireless communication technology known in the art. In an embodiment, any of the SPDs 110, 112, and 114, including any of the network base stations 106a, 106b, 118, 120, and 122, the router, gateway, switch device(s) 116, or any of the remote or local user equipment 108a-108c, 124, 126a-126c, 128, 130, and 132, may include any standard computing software and hardware necessary for processing, storing, and communicating data amongst each other within the networked computing system 100. The computing hardware realized in any of the data networked computing system 100 computing devices 106a, 106b, 108a-108c, 110, 112, 114, 116, 118, 120, 122, 124, 126a-126c, 128, 130, and 132 may include one or more processors, volatile and non-volatile memories, user interfaces, transcoders, and wireline and/or wireless communications transceivers, etc.

In an embodiment, any of the SPDs 110, 112, and 114 (including any of the network base stations 106a, 106b, 118, 120, and 122), the router, gateway, switch device(s) 116, or any of the remote or local user equipment 108a-108c, 124, 126a-126c, 128, 130, and 132, may be configured to include one or more computer-readable media (e.g., any common volatile or non-volatile memory type) encoded with a set of computer readable instructions, which when executed, performs a portion of one or more of the network traffic and radio communications quality monitoring or data content transfer optimization processes associated with various embodiments described herein.

Figure 2:
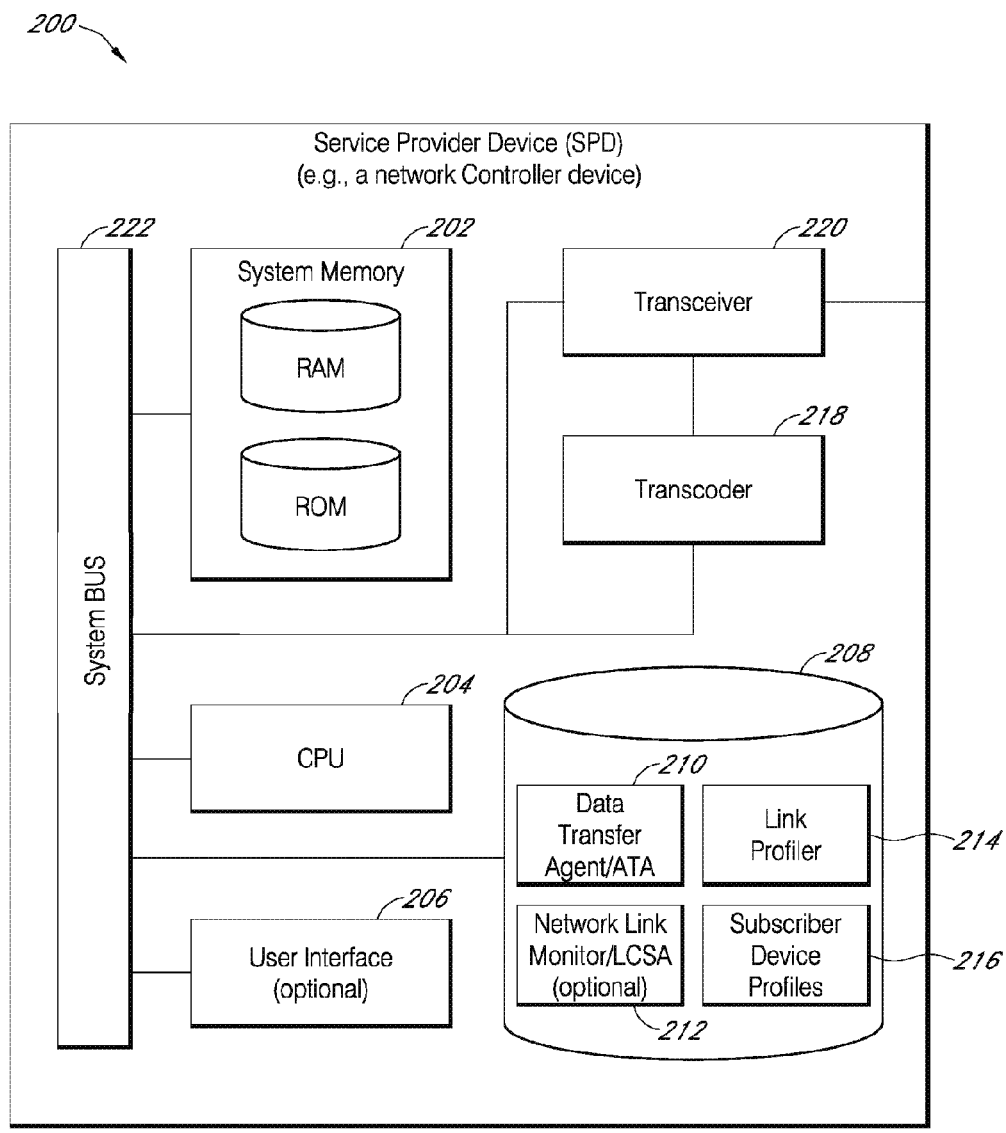
FIG. 2 shows a block diagram view of a service provider device according to some embodiments.

FIG. 2 shows a block diagram view of an SPD 200 that may be representative of any of the remote service provider devices SPDs 110, 112, and 114 (including the network base stations 106a, 106b, 118, 120, and 122), and the router, gateway, switch device(s) 116 of FIG. 1, or any other common network service provider device known in the art. The SPD 200 may include, but is not limited to, one or more processor devices including a central processing unit (CPU) 204. In an embodiment, the CPU 204 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 204 executes computer programs stored on the SPD's 200 volatile (RAM) and nonvolatile (ROM) system memories, 202 and 208.

The SPD 200 may also include an optional user interface 206 that allows a service provider administrator to interact with the device's software and hardware resources; a software/database repository 208; a transceiver 220 for transmitting and receiving network data communications amongst various network user equipment (e.g., any of devices 108a-108c, 124, 126a-126c, 128, 130, and 132) and SPDs (e.g., any of SPDs 106a, 106b, 110, 112, 114, 118, 120, 122, and 116) utilizing the data communication network 102 of the networked computing system 100; a transcoder 218 for formatting data communications prior to transfer; and a system bus 222 that facilitates data communications amongst all the hardware resources of the SPD 200.

The software/database repository 208 of SPD 200 can include a data transfer agent 210 (also referred to herein as an adaptive throttling agent or ATA) that may facilitate real time adjustment of data transfer rates based on comparisons of maximum link throughput to actual link throughput received from one or more user equipment (as a feedback) or from a local or external link capacity monitor. Software/database repository 208 of SPD 200 can also include a link profiler 214 that is capable of determining a current throughput capacity for a series of network links between a sender and a receiver, and a subscriber device profiles database 216 that is able to store user equipment profile and resident exhaustible resource information (information pertaining to battery power, processor usage, available memory, etc.). Furthermore, software/database repository 208 of SPD 200 can include an optional network link monitor 212 that may be capable of monitoring actual link throughput for particular network links of interest (also referred to herein as a link capacity sensing agent or LCSA).

In accordance with an embodiment of the present invention, the SPD 200 data transfer agent 210 may be logically linked to the link profiler 214 and the optional network link monitor 212 (or alternately to an external network link monitor component 312 of user equipment 300), such that the data transfers between a sender and receiver device (e.g., between a SPD 200 or a media content provider, and a user equipment 300) may be optimally managed (e.g., by throttling a data transfer rate or selecting preferred periods for data content delivery) based on real time evaluations of network traffic for communications links that are part of the communications path between (and optionally including) the sending and receiving devices.

Figure 3:
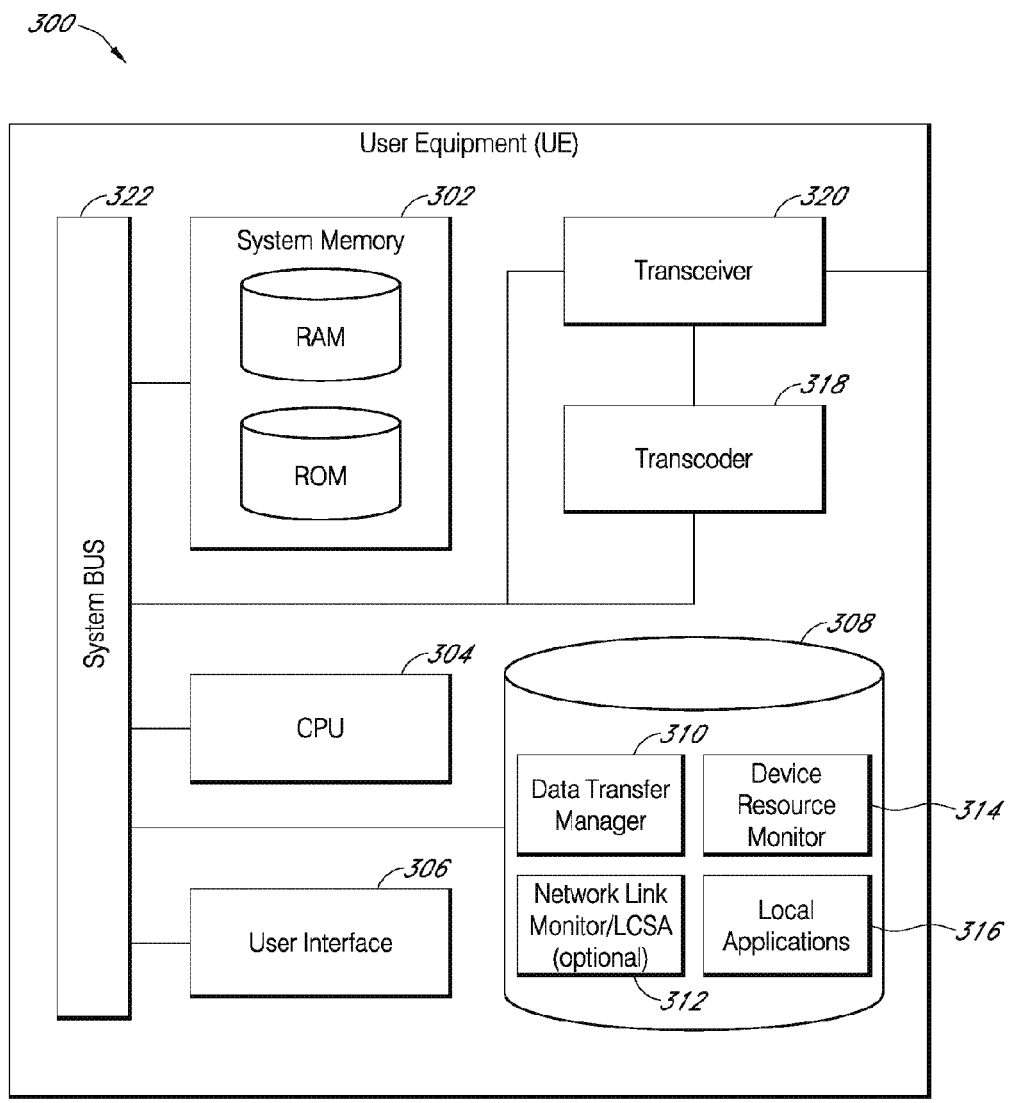
FIG. 3 shows a block diagram view of a user equipment according to some embodiments.

FIG. 3 shows a block diagram view of a user equipment 300 that may be representative of any of the user equipment terminals 108a-108c, 124, 126a-126c, 128, 130, and 132 in FIG. 1. The user equipment 300 may include, but is not limited to, one or more processor devices including a central processing unit (CPU) 304. In an embodiment, the CPU 304 may also include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 304 is responsible for executing all computer programs stored on the user equipment's 300 volatile (RAM) and nonvolatile (ROM) system memories, 302 and 308.

The user equipment 300 may also include, but is not limited to, a user interface 306 that allows a user to interact with its software and hardware resources; a software/database repository 308; a transcoder 318 for formatting data communications prior to transfer; a transceiver 320 for transmitting and receiving network communications amongst other network user equipment (e.g., any of user equipment 108a-108c, 124, 126a-126c, 128, 130, and 132), media content providers, and SPDs (e.g., any of SPDs 106a, 106b, 110, 112, 114, 116, 118, 120, and 122) utilizing the data communication network 102 of the networked computing system 100; and a system bus 322 that facilitates data communications amongst all the hardware resources of the user equipment 300.

Software/database repository 308 can include a data transfer manager 310 that facilitates communications amongst the user equipment 300, various SPDs (e.g., any of SPDs 106a, 106b, 110, 112, 114, 116, 118, 120, and 122), network service providers (e.g., media content providers), as well as other user equipment (e.g., any of user equipment 108a-108c, 124, 126a-126c, 128, 130, and 132) utilizing the data communication network 102 of the networked computing system 100; a network link monitor 312 that may be capable of monitoring actual link throughput for particular network links of interest (also referred to herein as a link capacity sensing agent or LCSA); a device resource monitor 314 that may be capable of monitoring resident device resources (e.g., such as power supply, processing, memory, and communications resources); and a local applications repository for storing various end user applications that can allow the user equipment 300 to perform various user preferred processes utilizing resident hardware and software resources.

In accordance with an embodiment of the present invention, the data transfer manager 310 may be logically linked to the network link monitor 312 (or alternately to an external network link monitor), and the device resource monitor 314, such that the user equipment 300 can monitor external network link capacities as well as its resident exhaustible resources in order to affect data transfers between itself and an external computing device (e.g., a SPD 200, a media content provider, or another user equipment). In an embodiment, in response to analyzing data obtained from the user equipment's 300 network link monitor 312 and/or device resource monitor 314, a data delivery to the user equipment 300 may be optimally managed (e.g., by throttling a data transfer rate or selecting preferred periods for data content delivery). This management may be based on real time evaluations of network traffic for communications links that are part of the communications path between (and optionally including) sending and receiving (e.g., the user equipment 300) devices. Examples of management and network traffic evaluations can be found in U.S. Pat. No. 7,500,010, ADAPTIVE FILE DELIVERY SYSTEM AND METHOD, Harrang et al., issued on Mar. 3, 2009; U.S. Pat. No. 8,019,886, SYSTEMS AND METHODS FOR ENHANCED DATA DELIVERY BASED ON REAL TIME ANALYSIS OF NETWORK COMMUNICATIONS QUALITY AND TRAFFIC, Harrang et al., issued on Sep. 13, 2011; and U.S. patent application Ser. No. 12/395,485, ADAPTIVE FILE DELIVERY SYSTEM AND METHOD Harrang et al., filed Feb. 27, 2009, all of which are incorporated herein by reference.

Figure 4:
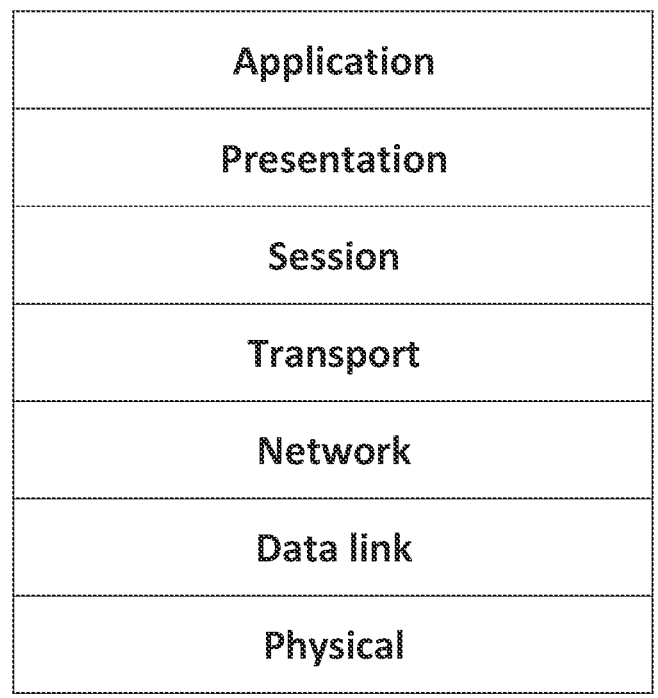
FIG. 4 is a schematic of the Open Systems Interconnection (OSI) network communications protocol stack.

FIG. 4 is a schematic of the Open Systems Interconnection (OSI) network communications protocol stack. The Application, Presentation and Session layers can be generally referred to as the upper application layers and correspond to the Application layer of the Transmission Control Protocol and Internet Protocol (TCP/IP). The Transport layer of the OSI stack corresponds to the transport layer of the TCP/IP protocol stack. The transport layers, and the layers below the transport layers, can be generally termed the lower protocol layers.

In an embodiment, user equipment 300 may request a delivery from a media content provider (a sender device) for a large media content file (e.g., a media content relating to music, a movie, a TV show, a software application, an e-book, a podcast, etc.) to their wireless device 300 using a specific wireless communications protocol using lower protocol layers. One or more network devices (e.g., user equipment 300 or SPDs 200) employing the communications protocol may sense a state of network channel congestion (e.g., using a network link monitor 212, 312). The congestion state may be determined, for example, by monitoring the performance of the media content file delivery over one or more network specific segments (e.g., by measuring/analyzing one or more network communications metrics) in the end-to-end link, measuring a peak, or best achievable, end-to-end link throughput performance for the combined network segments (e.g., with a receiver device, such as user equipment 300), and then comparing individual segment throughput with peak end-to-end link throughput. In this manner, network congestion can be detected (via the comparison), and the network segment(s) that may be the source of a congestion bottleneck can also be identified. Although in this disclosure, many embodiments are described as using a wireless network in a networked computer system, embodiments need not be limited to wireless networks. Embodiments may also be practiced in networked computer systems using a wired networks, or a combination of wired and wireless networks, and in other types of networks and links between endpoints (e.g., wired or fiber backhaul, and coaxial cable).

Figure 5:
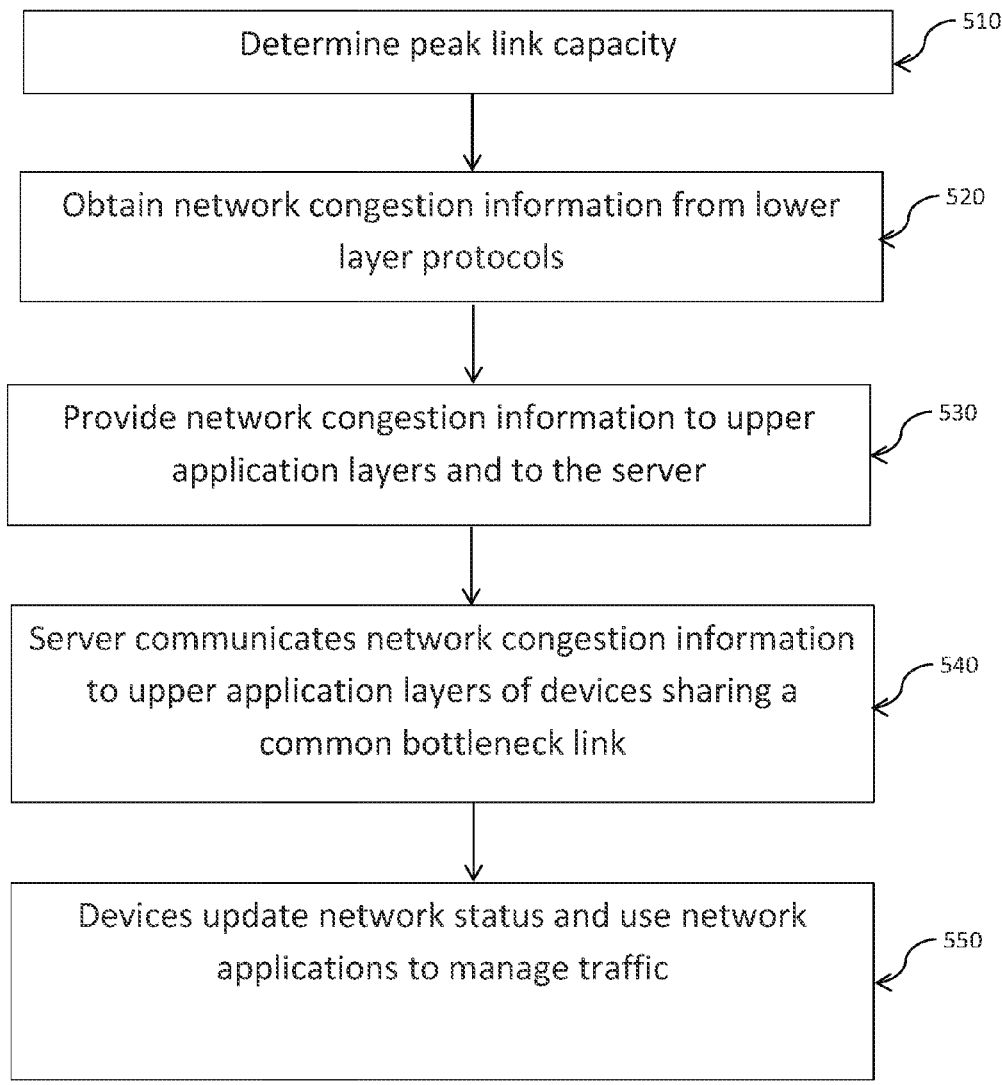
FIG. 5 illustrates a high-level view of a congestion update process in a wireless network environment according to an embodiment.

FIG. 5 illustrates a high-level view of a congestion update process in a wireless network environment according to an embodiment. At 510, a first user equipment (e.g., user equipment 300) can determine a peak link capacity associated with a network communications metric between a user equipment 300 and an SPD 200. Examples of network communications metrics include an employed modulation and coding scheme (MCS); a signal to interference plus noise ratio (SINR); a remaining link capacity; or a measured or a designated peak throughput for at least one service subscriber. Generally, a peak link capacity is associated with uncongested or otherwise resource-unconstrained end-to-end network performance. In some embodiments, step 510 is optional.

At 520, the first user equipment exchanges traffic with an SPD 200 and obtains network congestion information from lower layer communications protocols. Congestion information may include congestion status and congestion metrics. Congestion status can include, for example, throughput data delivery measurements over one or more specific network segments and end-to-end link throughput performance measurements for combined network segments. In some embodiments congestion status can include end-to-end data delivery performance accounting for resends of missing or lost data (i.e., goodput). In other embodiments congestion status can include end-to-end data delivery latency. Congestion status information may be used to calculate congestion metrics. Congestion metrics can include, for example, throughput rates for multiple delivered file segments that can be weighted according to the time of measurement, and throughput file delivery rates scaled according to end-to-end peak link capacities. In some embodiments congestion metrics can further include maximum permitted average delivery rate based on reported congestion status and combinations of derived congestion metrics. In some embodiments, the file segments consist of multiple data packets sent end-to-end and spanning sufficient time and data volume to obtain an estimate of the sustained performance of the end-to-end network. In some networks an example of a file segment size is approximately 16 kiloBytes (kBytes).

At 530, the first user equipment passes congestion information that may be passed to the upper application layers of other user equipment or servers. First user equipment also provides the congestion information to a server on the network. As an alternative, the peak link capacity and network congestion information can be determined by a server on the networked computer system based on congestion metrics passed to it by the user equipment.

At 540, the server forwards the network congestion information to the upper application layers of devices connected via the network, and sharing a bottleneck link with the first user equipment. The devices can include one or more user equipment devices, servers networked to these devices, and additional service provider devices. At 550, the devices receiving the network congestion information uses the information to manage its data transfers. For example, the devices may throttle a data transfer rate or select preferred periods for data content delivery. In an embodiment, described in U.S. Pat. No. 7,500,010, ADAPTIVE FILE DELIVERY SYSTEM AND METHOD, Harrang et al., issued on Mar. 3, 2009, and incorporated herein by reference, data transfer agent 210 is an adaptive throttling agent that can determine the maximum average throughput rate of the sender-to-receiver data flow, Rmax, which can then be enforced by either a sender or receiver to pace the rate of requests from a receiver for subsequent portions of the data file being transferred.

Figure 6:
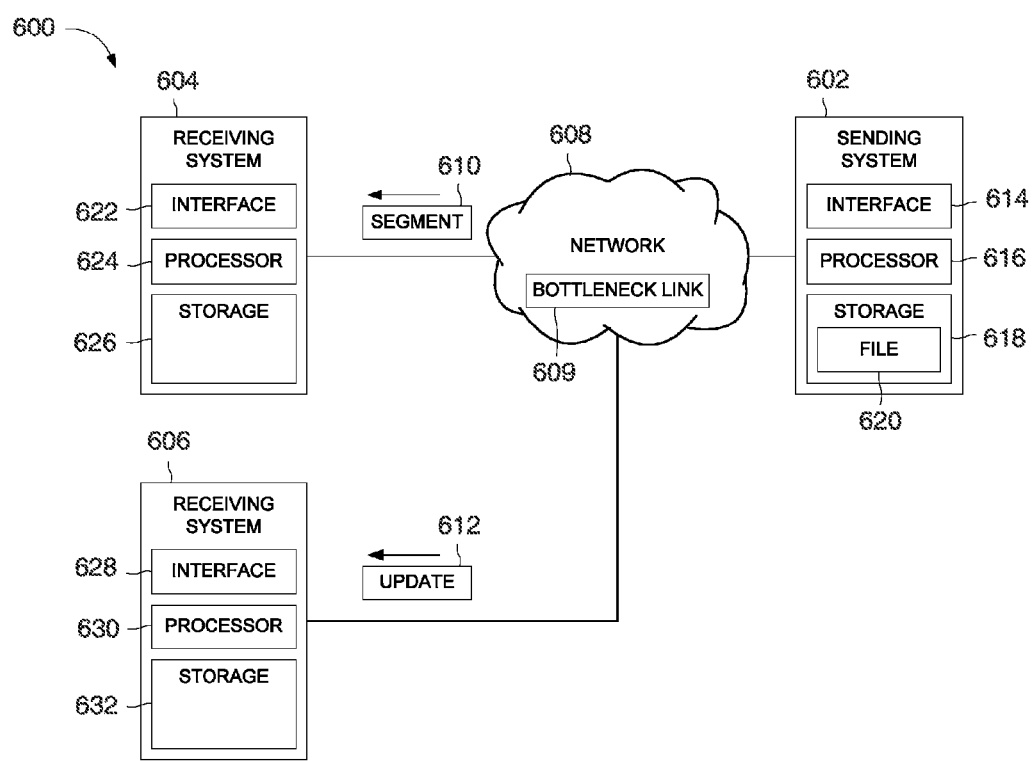
FIG. 6 illustrates a networked computer system according to an embodiment.

FIG. 6 illustrates a networked computer system 600 according to an embodiment. Computer system 600 includes a sending system 602 and two receiving systems 604 and 606, all of which are communicatively linked to a network 608. The sending system 602 could be a computer system or a plurality of collocated or distributed computer systems such as a servers, databases, storage units, routers, switches, firewalls, or other such devices, connected via fiber, wireline, wireless means to the network 608. In some embodiments, sending system 602 is an SPD 200 as described herein.

Each of receiving systems 604 and 606 could be collocated with a DVR, PC, network storage unit, client work station, television set top box, modem, gateway, or other such devices such as a tablet, portable audio-video player, mobile communication device such as a cell phone or in a dedicated hardware unit. The receiving systems 604 and 606 could be connected via fiber, wireline, wireless means to the network 608.

In some embodiments, receiving systems 604 and 606 each may be user equipment 300 as described herein.

The network 608 could include one or more network components from the Internet or other networks, such as WANs, including but not limited to wired (DSL, cable, powerline), fiber, wireless, satellite, and cellular type networks. The network 608 could include other such network components such as but not limited to modems, routers, bridges, gateways, network interfaces, cabled transmissions, wireless transmissions, local area networks (LANs), access networks, provider networks, and peer-to-peer arrangements.

The sending system 602 includes an interface 614 to access the network 608, a processor 616, and storage 618 containing a file 620 to be transmitted over the network to the receiving system 604. Sending system 602 may include one or more modules with instructions to implement adaptive file delivery methods.

The receiving system 604 includes an interface 622 to access the network 608, a processor 624, and storage 626 to store copies of portions of the file 620 received from the sending system 602 and to store one or more modules to implement instructions regarding adaptive file delivery methods. It is understood that the receiving system 604 could be located at an end user's location or be located at some intermediary network location e.g. to serve as a caching node for distributing content geographically closer to a plurality of end users.

The receiving system 606 includes an interface 628 to access the network 608, a processor 630, and storage 632 to store update 612 received from the sending system 602. It is understood that the receiving system 606 could be located at an end user's location or be located at some intermediary network location e.g. to serve as a caching node for distributing content geographically closer to a plurality of end users.

Sending system 602 and receiving systems 604 and 606 may include data stored on a non-transitory computer readable medium in a memory within or separate from storage 618, 626 and 632, respectively. The data may include computer executable instructions which, when executed by processors 616, 624, and 630, respectively, perform one or more processes associated with embodiments of the present invention. Thus sending system 602 and receiving systems 604 and 606 may perform the measurements and calculations disclosed herein. Receiving systems 604 and 606 share at least one bottleneck link 609 in network 608. In an embodiment, the bottleneck link 609 is a base station 106*a*, 106*b*, 118, 120, 122. In another embodiment, the bottleneck 609 is a network link segment, or a switch, or a router, or a node in the Internet.

A bottleneck link is that portion of a shared communications channel that limits the throughput capacity of the channel. Regardless of the type of network employed, a bottleneck link may exist (whether wireless, wired or fiber in nature) between the server and one or more user terminals. The bottleneck link is shared in terms of the traffic capacity of the link. For example, in consumer access networks, the last mile of the communication channel is typically a shared resource (e.g., wireless cell, base station backhaul, or coaxial cable network), and in many cases for cost reasons the last mile is the limiting capacity resource, or the bottleneck link.

Referring to FIG. 6, methods for determining which receiving systems share a bottleneck link 609 in the network path to a common sending system 602 depend on the type of network connecting the endpoints. In some embodiments, the network 608 includes a wireless network, and the bottleneck link 609 is the last-mile wireless link. In this example, receivers may be associated by examining the serving cell equipment identifier reported to a server by the terminals (e.g., receiving systems 604, 606 and/or sending system 602). In certain embodiments, the network 608 includes a coaxial cable as the last mile access, and the bottleneck link 609 is the shared cable plant connecting the cable modem termination system (CMTS) to a group of terminals (e.g., receiving systems 604, 606 and/or sending system 602). In these cases, receivers may be associated by the CMTS identifier of the terminals (e.g., receiving systems 604, 606 and/or sending system 602). In another embodiment, the bottleneck link 609 in network 608 may be identified using known techniques for determining the address identifier of the bottleneck link 609, and terminals (e.g., receiving systems 604, 606 and/or sending system 602) sharing the bottleneck link 609 are grouped by the server. In yet another embodiment, terminals (e.g., receiving systems 604, 606 and/or sending system 602) sharing the bottleneck link 609 may be determined by network construction and manually configured to the server.

In an embodiment, the sending system 602 in FIG. 6 sends one or more file segments 610 over the network 608 to the receiving system 604. Receiving system 604 measures the delivery performance of file segments 610 and collects congestion status measurements. Receiving system 604 may calculate metrics and provide congestion information to sending system 602, for example in a control message, which is not shown in FIG. 6. Sending system 602 sends update message 612 to receiving system 606. Receiving system 606 receives the updated network congestion information.

In another embodiment, the sending system 602 in FIG. 6 sends one or more file segments 610 over the network 608 to the receiving system 604. Sending system 602 measures the delivery of file segments 610 and collects congestion status measurements. Sending system 602 may calculate metrics and provide congestion information in update message 612 to receiving system 606. Receiving system 606 receives the updated network congestion information. Sending system 602 may also send an update 612 to receiving system 604, or provide information through a control message, which are not shown in FIG. 6. It can be understood that in some embodiments, more than one sending system may send file segments to a plurality of receiving systems.

In an embodiment, file segment 608 is a copy of a portion of the file 620. File 620 may be divided into multiple file segments 608 for data transmission, with each file segment sent at a different time. In some embodiments that employ a wireless network, the size of the file segment may be designed to connect with the wireless network and to engage the wireless channel at a higher speed in cases where lower layer communication protocols segregate access to differentiated speed channels by file transfer size. In such instances, the initial portion of a larger data burst may see transfer of smaller packets in a slower shared multiple access channel, followed by an abrupt increase in rate as the data burst transfers to a higher-speed dedicated channel. This may affect the congestion status measurements and decrease the accuracy of the throughput rate calculations. A larger file segment size may improve throughput rate calculations by moving quickly through this start-up effect. Thus in certain embodiments, the file segment size is sixteen kBytes. In some embodiments, the file segment size is more than or less than sixteen kBytes.

In some embodiments, and as generally provided above, network congestion status can include measurements of the amount of data transferred between a sender (i.e., sending system) and a receiver (i.e., a receiving system), together with the time for delivery of that data. Congestion metrics, such as for example the rate of data transfer or data download, can then be calculated. In an example, the sender may be end user equipment and the receiver a server connected to the end user equipment through a network. In another example, the receiver may be end user equipment and the sender a server connected to the end user equipment through a network. Thus the roles of sender and receiver may be assigned according to the direction of data transfer over the network, with either sender or receiver measuring congestion status and calculating congestion metrics. Each direction of data transfer over the network may have its own separate network congestion information. Embodiments of the disclosure can therefore be applied in a bi-directional manner.

Figure 7:
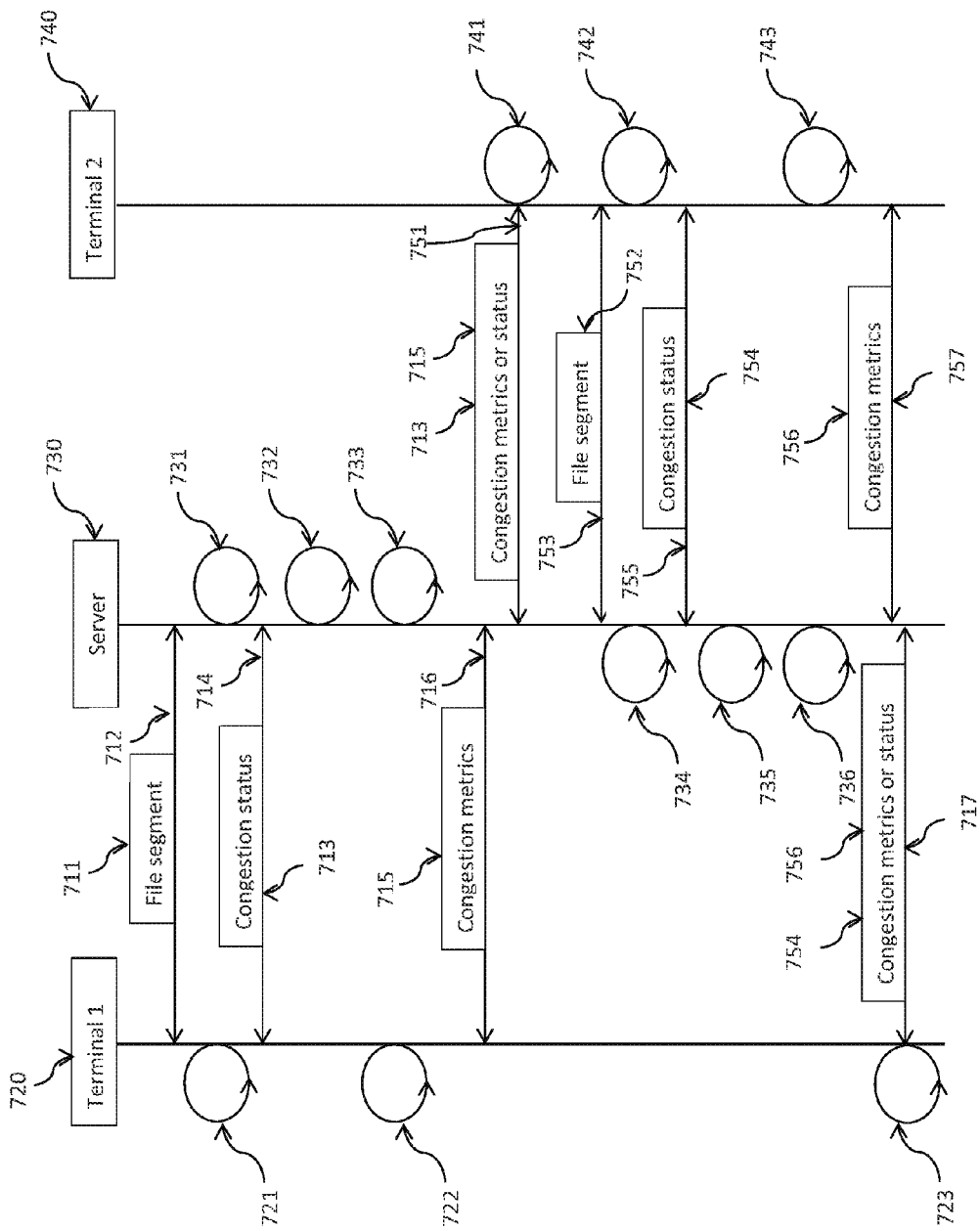
FIG. 7 illustrates an embodiment featuring a server and two terminals.

FIG. 7 illustrates an embodiment featuring a server and two terminals. In an embodiment, a first terminal 720 and a second terminal 740 are connected through a network to server 730. Terminals 720 and 740 share a bottleneck link. In an embodiment, in step 712, a file segment 711 is transmitted between terminal 720 and server 730. In some cases, the file segment is transmitted from the terminal to the server. In other cases, the file segment is transmitted from the server to terminal Thus in practice a server and a terminal may play the role of a sending system or receiving system.

File segment 711 can be used to measure the congestion status of the network having a bottleneck link. The file segment may be delivered under conditions derived from previously obtained congestion information, or delivered under conditions derived from default network condition settings (e.g., default transfer rate). In some cases, more than one file segment may be transmitted so that the congestion status of the network can averaged over multiple measurements. In certain instances, the file segment may be of sufficient size under network conditions such that the sustained end-to-end data throughput through the bottleneck link may be determined. In some cases, the file segment 711 is sixteen kBytes in size. Methods of determining the sustained congestion status of the network are disclosed in U.S. Pat. No. 7,500,010, ADAPTIVE FILE DELIVERY SYSTEM AND METHOD, Harrang et al., issued on Mar. 3, 2009; U.S. Pat. No. 8,019, 886, SYSTEMS AND METHODS FOR ENHANCED DATA DELIVERY BASED ON REAL TIME ANALYSIS OF NETWORK COMMUNICATIONS QUALITY AND TRAFFIC, Harrang et al., issued on Sep. 13, 2011; and U.S. patent application Ser. No. 12/395,485, ADAPTIVE FILE DELIVERY SYSTEM AND METHOD Harrang et al., filed Feb. 27, 2009, all of which are incorporated herein by reference.

In some embodiments, terminal 720 receives file segment 711 and measures the network congestion status in step 721. The network congestion status 713 is then communicated to server 730 in step 714. In an alternative, server 730 determines the network congestion status in step 731 based on the delivery acknowledgment from terminal 720 where the delivery acknowledgment also includes file segment delivery performance sufficient to determine the current congestion status. Server 730 may send the network congestion status 713 to terminal 720 in step 714. In another alternative, both terminal 720 and server 730 determine network congestion status at steps 721 and 731, respectively.

In certain other embodiments, terminal 720 sends file segment 711 and determines the network congestion status in step 721 based on a delivery acknowledgment from server 730. The network congestion status 713 is then communicated to server 730 in step 714. In an alternative, server 730 measures the network congestion status in step 731. Server 730 may send the network congestion status 713 to terminal 720 in step 714. In another alternative, both terminal 720 and server 730 determine network congestion status at steps 721 and 731, respectively.

In certain embodiments, at step 732, server 730 determines the receivers (i.e., terminals or end users) to receive network congestion status 713. Examples of factors that may be relevant in this determination include which terminals that share a bottleneck link with terminal 720 are currently active in using the network; which application the terminal(s) may be operating; which Quality of Service configuration or mechanisms are currently employed in the network; and which protocols or procedures addressing network congestion are currently in force. In some cases, the determination may be based on a policy stored on the server that may be configured to take into account one or more of the above factors. In certain cases, all receivers (i.e., terminals or end users) sharing the bottleneck link are selected for update one by one with unicast messages, and in other cases with a multicast or broadcast message. While FIG. 7 illustrates a single second terminal, some embodiments contemplate a plurality of receivers that may receive the congestion status update. It may also be appreciated that in cases where zero second terminals are selected for update that server 730 performs no updates.

In some embodiments, the terminal 720 or the server 730 can calculate congestion metrics 715 based on the congestion status 713 at steps 722 and 733, respectively. In some embodiments, the terminal 740 can calculate congestion metrics at step 741 based on the congestion status 715 received from the server as further described below. Congestion status can include, for example, throughput data delivery measurements over one or more specific network segments and end-to-end link throughput performance measurements for combined network segments. Congestion status information may be used to calculate congestion metrics. Congestion metrics can include, for example, throughput rates for multiple delivered file segments that can be weighted according to the time of measurement, and throughput file delivery rates scaled according to end-to-end peak link capacities. In some cases, congestion status values are weighted according to their age, which is in turn based on the time of the measurement of file delivery segments. In other examples, averaging strategies can be employed to weight the most recent congestion status values, or to reduce rapid congestion status measurement variation.

In an embodiment, an exemplary weighting calculation assumes a set of N available congestion estimates of rate (R) that represent a measured data throughput rate of a delivered file segment 711. Each estimate is weighted as follows:

$$W_i = m \cdot t_i + 1$$

where $m = -1/t_c$. $t_c$ is a set cutoff time, where $t_i > t_c$, and $t_i$ is the time corresponding to the sample time of $R_i$, $i=[1,N]$ integer.

The weights are determined and normalized over [0,1] using $$W_i' = W_i \cdot (1/\mathrm{SUM}(W_i)),$$

where the SUM runs $i=[1,N]$ integer.

In many embodiments, some or all of the receivers may have different file delivery capacities. Therefore, in these cases, the congestion metrics for the receivers are scaled accordingly to take capacities into account:

$$(R/RP)e = \mathrm{SUM}(W_i' \cdot (R_i/RP)),$$

where the SUM runs $i=[1,N]$ integer, and RP is the peak or maximum throughput measurement for the receiver over the link determined by channel profiling measurement, or established by historical measurements or by configuration.

The ensemble average ratio, (R/RP)e may be used to determine the throughput constraint for file segment delivery under the measured network conditions:

$$R_{MAX} = g((R/RP)e)$$

where g( ) is a backoff function for which its definition is related to the policy for congestion flow control. In some embodiments, congestion metric $R_{MAX}$ is the maximum average throughput rate of the sender-to-receiver data flow, which can be enforced by upper layer control protocols to pace the rate of requests from a receiver for subsequent portions of the data file being transferred.

In embodiments, after the congestion metrics 715 are calculated, the metrics can be communicated to server 730 by terminal 720, or communicated to terminal 720 from server 730. In cases in which server 730 determines in step 732 that a plurality of receivers (i.e., terminals or end users) should receive a network congestion update, server 730 may communicate congestion status 713 or congestion metrics 715 to receivers such as terminal 740 in step 751. In those instances in which terminal 740 receives congestion status 713, terminal 740 can calculate its congestion metrics in step 741.

In some embodiments, terminal 740 is active within the network and may provide congestion status to the server. In an embodiment, in step 752, file segment 753 is transmitted between terminal 740 and server 730. In some cases, the file segment is transmitted from the terminal to the server. In other cases, the file segment is transmitted from the server to terminal. Thus in practice a server and a terminal may play the role of a sending system or receiving system.

File segment 752 can be used to determine the congestion status of the network having a bottleneck link. In some embodiments, terminal 740 receives file segment 752 and measures the network congestion status in step 742. The network congestion status 754 is then communicated to server 730 in step 755. In an alternative, server 730 determines the network congestion status in step 734 based on the delivery acknowledgment from terminal 740 where the delivery acknowledgment also includes file segment delivery performance sufficient to determine the current congestion status. Server 730 may send the network congestion status 754 to terminal 740 in step 755. In another alternative, both terminal 740 and server 730 determine network congestion status at steps 742 and 734, respectively.

In certain other embodiments, terminal 740 sends file segment 752 and determines the network congestion status in step 742 based on a delivery acknowledgment from server 730. The network congestion status 754 is then communicated to server 730 in step 755. In an alternative, server 730 measures the network congestion status in step 734 based on file segment delivery measurements. Server 730 may send the network congestion status 754 to terminal 740 in step 755. In another alternative, both terminal 740 and server 730 determine network congestion status at steps 742 and 734, respectively.

In certain embodiments, at step 735, server 730 determines the receivers (i.e., terminals or end users) to receive network congestion status 754. Examples of factors that may be relevant in this determination include which terminals that share a bottleneck link with terminal 740 are currently active in using the network; which application the terminal(s) may be operating; which Quality of Service configuration or mechanisms are currently employed in the network; and which protocols or procedures addressing network congestion are currently in force. In some cases, the determination may be based on a policy stored on the server that may be configured to take into account one or more of the above factors. In certain cases, all receivers (i.e., terminals or end users) sharing the bottleneck link are selected for update one by one with unicast messages, and in other cases with a multicast or broadcast message. While FIG. 7 illustrates a single second terminal, some embodiments contemplate a plurality of receivers that may receive the congestion status update. It may also be appreciated that in cases where zero second terminals are selected for update that server 730 performs no updates.

In some embodiments, the terminal 740 or the server 730 can calculate congestion metrics 757 based on the congestion status 754 at steps 743 and 736, respectively. Exemplary calculations for congestion metrics, such as for example $R_{MAX}$, are previously discussed herein.

In embodiments, after the congestion metrics 756 are calculated, the metrics can be communicated to server 730 by terminal 740, or communicated to terminal 740 from server 730. In cases in which server 730 determines in step 735 that a plurality of receivers (i.e., terminals or end users) should receive a network congestion update, server 730 may communicate congestion status 754 or congestion metrics 756 to receivers such as terminal 720 in step 717. In those instances in which terminal 720 receives congestion status 754, terminal 720 can calculate its congestion metrics in step 723.

Referring to FIG. 1, in an embodiment, server 730 is a base station 106a, 106b, 118, 120, 122 and terminals 720 and 740 are mobile devices or phones 108a-108c that are within a coverage area of the base station and are joined to the base station. The base station may be a macro base station, pico base station, femto base station, or the like. In an implementation, if the base station or a base station controller receives a congestion status from one of the mobile devices 108, the base station or controller determines other mobile devices that are joined to the base station by accessing stored status records of the unique identifiers of currently attached (joined) mobile devices (e.g. attachment status known via mobility protocol exchanges between mobile devices and serving base station), and broadcasts congestion information to these other mobile devices. These other mobile devices then reduce their bandwidth requests to the base station. In another implementation, upon receiving a congestion status from one of the mobile devices that is joined to the base station, the base station sends congestion information to selected mobiles devices based on the current bandwidth being used or expected bandwidth usage of the these other mobile devices. The selected mobile devices adjust their bandwidth requests to the base station upon receiving the congestion information from the base station. These selected mobile devices are part of the mobile devices that within the coverage area and are joined to the base station.

FIG. 7 illustrates an embodiment that employs a single common server between two or more terminals that share a bottleneck link. In some embodiments, the plurality of terminals that share a bottleneck link may each use different servers. In such cases, information (e.g., congestion status or congestion metrics) communicated to a server by a terminal may be replicated between or among the servers connected to the terminals sharing the bottleneck link. Thus each server is provided common information that informs the congestion status of the network, and the servers may send updates to other logically grouped user terminals.

Figure 8:
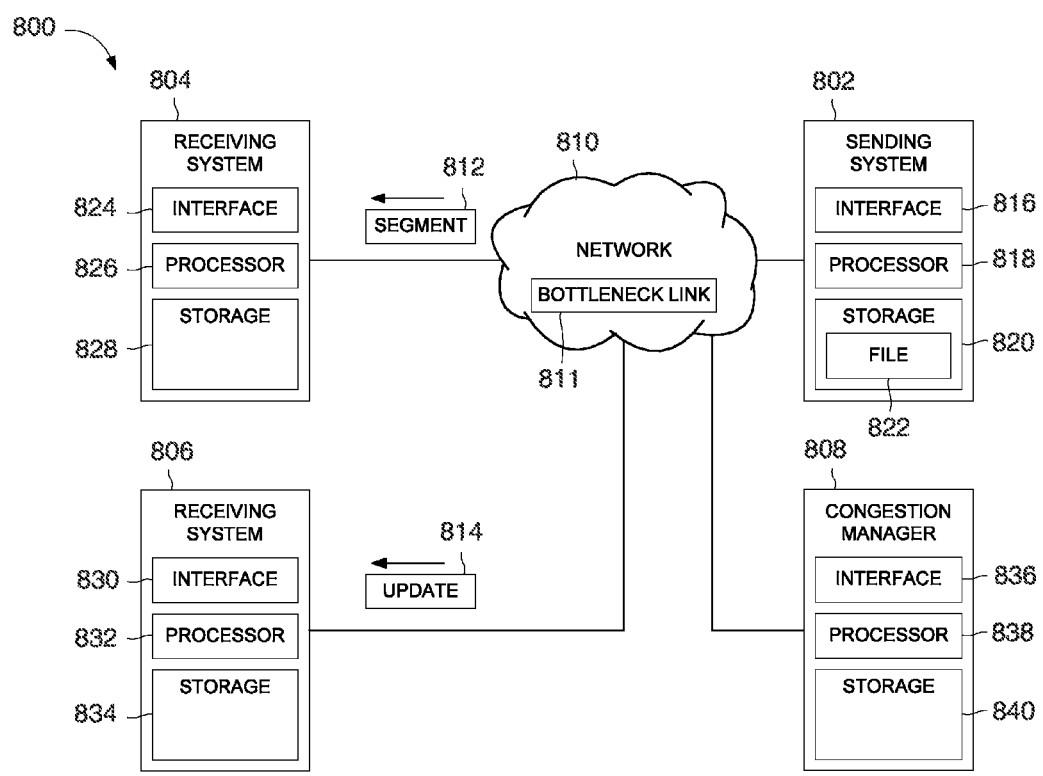
FIG. 8 illustrates a networked computer system according to an embodiment.

FIG. 8 illustrates a networked computer system 800 according to a further embodiment. Computer system 800 includes a sending system 802 and two receiving systems 804 and 806, and a congestion manager 808, all of which are communicatively linked to a network 810. The sending system 702 could be a computer system or a plurality of collocated or distributed computer systems such as a servers, databases, storage units, routers, switches, firewalls, or other such devices, connected via fiber, wireline, wireless means to the network 810. It can be understood that in some embodiments, more than one sending system may send file segments to a plurality of receiving systems.

Each of receiving systems 804 and 806 could be collocated with a DVR, PC, network storage unit, client work station, television set top box, modem, gateway, or other such devices such as a tablet, portable audio-video player, cellular communication device such as a cell phone or in a dedicated hardware unit. The receiving systems 804 and 806 could be connected via fiber, wireline, wireless means to the network 808.

The network 810 could include one or more network components from the Internet or other networks, such as WANs, including but not limited to wired (DSL, cable, powerline), fiber, wireless, satellite, and cellular type networks. The network 808 could include other such network components such as but not limited to modems, routers, bridges, gateways, network interfaces, cabled transmissions, wireless transmissions, local area networks (LANs), access networks, provider networks, and peer-to-peer arrangements.

The sending system 802 includes an interface 816 to access the network 810, a processor 818, and storage 820 containing a file 822 to be transmitted over the network to the receiving system 804. The congestion manager 808 includes an interface 836 to access the network 810, a processor 838, and storage 840. Congestion manager 808 may include one or more modules with instructions to implement adaptive file delivery methods to be transmitted over the network to receiving systems 804 and 806.

The receiving system 804 includes an interface 824 to access the network 810, a processor 826, and storage 828 to store copies of portions of the file 822 received from the sending system 802 and to store one or more modules to implement instructions regarding adaptive file delivery methods. It is understood that the receiving system 804 could be located at an end user's location or be located at some intermediary network location e.g. to serve as a caching node for distributing content geographically closer to a plurality of end users.

The receiving system 806 includes an interface 830 to access the network 810, a processor 832, and storage 834 to store update 814 received from the congestion manager 808. It is understood that the receiving system 806 could be located at an end user's location or be located at some intermediary network location e.g. to serve as a caching node for distributing content geographically closer to a plurality of end users.

Sending system 802, receiving systems 804 and 806, and congestion manager 808 may include data stored on a non-transitory computer readable medium in a memory within or separate from storage 820, 828, 834, and 840, respectively. The data may include computer executable instructions which, when executed by processors 816, 824, and 830, respectively, perform one or more processes associated with embodiments of the present invention. Thus sending system 802, receiving systems 804 and 806, and congestion manager 808 may perform the measurements and calculations disclosed herein. Receiving systems 804 and 806 share at least one bottleneck link 811 in network 810.

A bottleneck link is that portion of a shared communications channel that limits the throughput capacity of the channel. Regardless of the type of network employed, a bottleneck link may exist (whether wireless, wired or fiber in nature) between the server and one or more user terminals. The bottleneck link is shared in terms of the traffic capacity of the link. For example, in consumer access networks, the last mile of the communication channel is typically a shared resource (e.g., wireless cell, base station backhaul, or coaxial cable network), and in many cases for cost reasons the last mile is the limiting capacity resource, or the bottleneck link.

Referring to FIG. 8, methods for determining which receiving systems share a bottleneck link 811 in the network path to a common sending system 802 depend on the type of network connecting the endpoints. In some embodiments, the network 810 is connected via a wireless network, and the bottleneck link 811 is the last-mile wireless link. In this example, receivers may be associated by examining the serving cell equipment identifier reported to a congestion manager 808 by the terminals (e.g., receiving systems 804, 806 and/or sending system 802). In certain embodiments, the network 810 includes a coaxial cable as the last mile access, and the bottleneck link 811 is the shared cable plant connecting the cable modem termination system (CMTS) to a group of terminals (e.g., receiving systems 804, 806 and/or sending system 802). In these cases, receivers may be associated by the CMTS identifier of the terminals (e.g., receiving systems 804, 806 and/or sending system 802). In another embodiment, the bottleneck link 811 in network 810 may be identified using known techniques for determining the address identifier of the bottleneck link 811, and terminals (e.g., receiving systems 804, 806 and/or sending system 802) sharing the bottleneck link 811 are grouped by the congestion manager 808. In yet another embodiment, terminals (e.g., receiving systems 804, 806 and/or sending system 802) sharing the bottleneck link 811 may be determined by network construction and manually configured to the congestion manager 808.

In an embodiment, the sending system 802 in FIG. 8 sends one or more file segments 812 over the network 810 to the receiving system 804. Receiving system 804 measures the delivery performance of file segments 812 and collects congestion status measurements. Receiving system 804 may calculate metrics and provide congestion information to congestion manager 808, for example in a control message, which is not shown in FIG. 8. In some embodiments, the sending system 802 may deliver content without participating in the congestion management process. In such cases, other methods may be used by receiving system 804 to detect congestion, including without limitation, monitoring the average end-to-end delivery throughput rates; the file segment end-to-end delivery throughput rates; monitoring dropped data packet rates; monitoring data packet latency; and monitoring data packet header congestion marking. Congestion manager 808 sends update message 814 to receiving system 806. Receiving system 806 receives the updated network congestion information.

In another embodiment, the sending system 802 in FIG. 8 sends one or more file segments 812 over the network 810 to the receiving system 804. Congestion manager 808 determines the time for delivery of file segments 812 and collects congestion status measurements. Congestion manager 808 may in some embodiments calculate congestion metrics. Congestion manager 808 sends update message 814 to receiving system 806. Receiving system 806 receives the updated network congestion status. Congestion manager 808 may also send an update 814 to receiving system 804, or provide information through a control message, which are not shown in FIG. 8.

Congestion manager 808 may be located anywhere in the network. As an example, in a central location with network connectivity to user terminals. In another example, congestion manager 808 may be located at the aggregation point for user terminal traffic, such as in a wireless base station or base station controller. Congestion manager 808 may use any methods for detecting congestion, including without limitation, measuring the delivery rates for transferred file segments over one or more network specific segments such as the bottleneck link, measuring and end-to-end link throughput performance for the combined network segments and comparing individual segment throughput with peak, or best-achievable, end-to-end link throughput, monitoring the average throughput rates; monitoring dropped data packet rates; monitoring data packet latency; and monitoring data packet header congestion marking.

In an embodiment, file segment 812 is a copy of a portion of the file 822. File 822 may be divided into multiple file segment 812 for data transmission, with each file segment sent at a different time. In some embodiments that employ a wireless network, the size of the file segment may be designed to connect with the wireless network and to engage the wireless channel at a higher speed in cases where lower layer communication protocols segregate access to differentiated speed channels by file transfer size. In such instances, the initial portion of a larger data burst may see transfer of smaller packets in a slower shared multiple access channel, followed by an abrupt increase in rate as the data burst transfers to a higher-speed dedicated channel. This may affect the congestion status measurements and decrease the accuracy of the throughput rate calculations. A larger file segment size may improve throughput rate calculations by moving quickly through this start-up effect. Thus in certain embodiments, the file segment size is sixteen kBytes. In some embodiments, the file segment size is more than or less than sixteen kBytes.

In some embodiments, and as generally provided above, network congestion status can include measurements of the amount of data transferred between a sender (i.e., sending system) and a receiver (i.e., a receiving system), together with the time for delivery of that data. Congestion metrics, such as for example the rate of data transfer or data download, can then be calculated. In an example, the sender may be end user equipment and the receiver a server connected to the end user equipment through a network. In another example, the receiver may be end user equipment and the sender a server connected to the end user equipment through a network. Thus the roles of sender and receiver may be assigned according to the direction of data transfer over the network, with either sender or receiver measuring congestion status and calculating congestion metrics. Each direction of data transfer over the network may have its own separate network congestion information. Embodiments of the disclosure can therefore be applied in a bi-directional manner.

Figure 9:
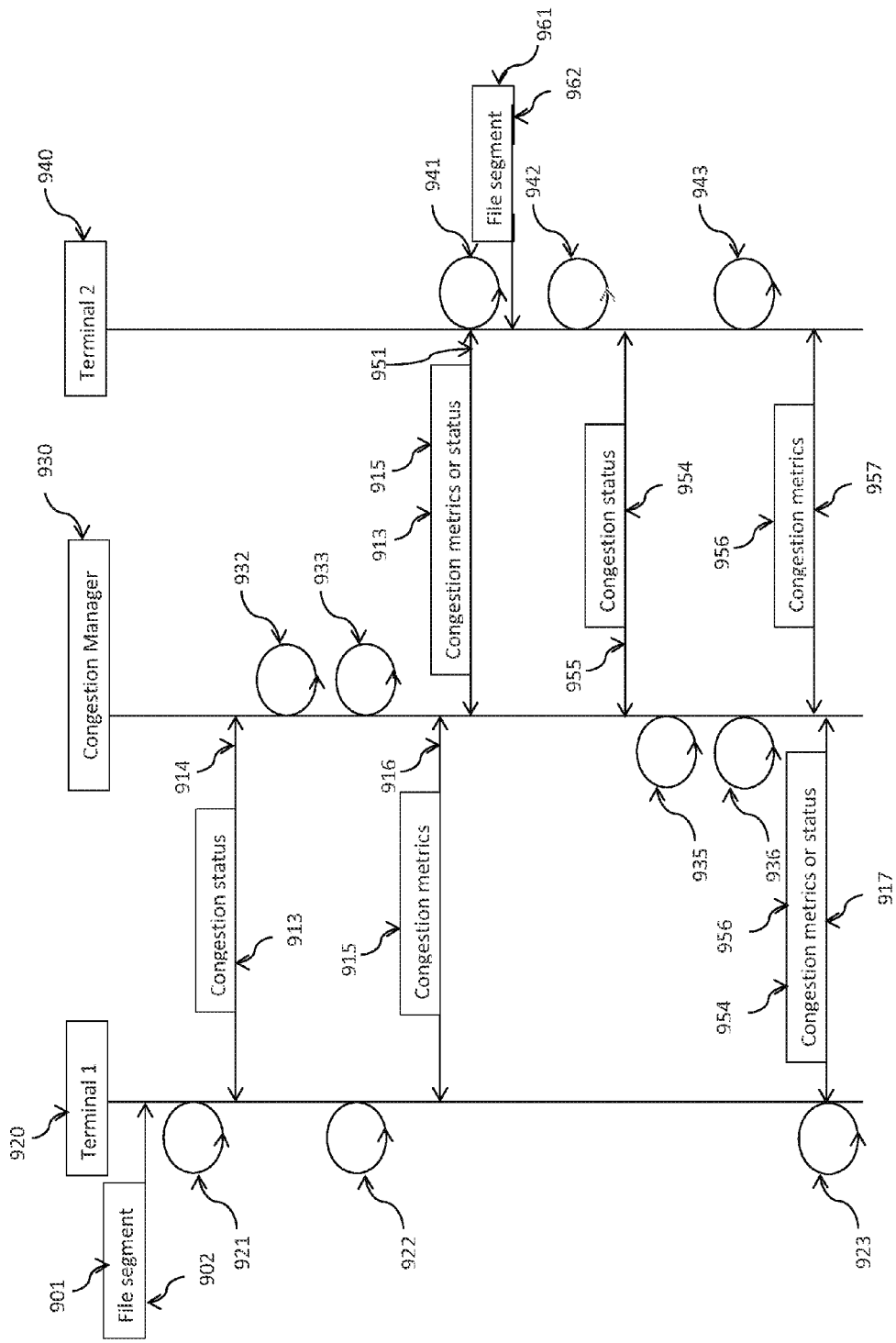
FIG. 9 illustrates an embodiment featuring a congestion manager and two terminals.

FIG. 9 illustrates an embodiment featuring a congestion manager and two terminals. In an embodiment, a first terminal 920 and a second terminal 940 that are connected to congestion manager 930. Terminals 920 and 940 share a bottleneck link. In an embodiment, in step 902, file segment 901 is delivered to terminal 920 from a content delivery system not shown in FIG. 9.

File segment 901 can be used to measure the congestion status of the network having a bottleneck link. The file segment may be delivered under conditions derived from previously obtained congestion information, or delivered under conditions derived from default network condition settings (e.g., default transfer rate). In some cases, more than one file segment may be transmitted so that the congestion status of the network can averaged over multiple measurements. In certain instances, the file segment may be of sufficient size under network conditions such that the sustained end-to-end data throughput through the bottleneck link may be determined. In some cases, the file segment 901 is sixteen kiloBytes in size.

In some embodiments, terminal 920 receives file segment 901 and measures the network congestion status in step 921. The network congestion status 913 is then communicated to congestion manager 930 in step 914.

In certain embodiments, at step 932, congestion manager 930 determines the receivers (i.e., terminals or end users) to receive network congestion status 913. Examples of factors that may be relevant in this determination include which terminals that share a bottleneck link with terminal 920 are currently active in using the network; which application the terminal(s) may be operating; which Quality of Service configuration or mechanisms are currently employed in the network; and which protocols or procedures addressing network congestion are currently in force. In some cases, the determination may be based on a policy stored on congestion manager 930 that may be configured to take into account one or more of the above factors. In certain cases, all receivers (i.e., terminals or end users) sharing the bottleneck link are selected for update one by one with unicast messages, and in other cases with a multicast or broadcast message. While FIG. 9 illustrates a single second terminal, some embodiments contemplate a plurality of receivers that may receive the congestion status update. It may also be appreciated that in cases where zero second terminals are selected for update that server 730 performs no updates.

In some embodiments, the terminal 920 or the congestion manager 930 can calculate congestion metrics 915 based on the congestion status 913 at steps 922 and 932, respectively. In some cases, congestion status values are weighted according to their age, which is in turn based on the time of the measurement. In other examples, averaging strategies can be employed to weight the most recent congestion status values, or to reduce congestion status measurement noise. Exemplary calculations for congestion metrics, such as for example $R_{MAX}$, are previously discussed herein.

In embodiments, after the congestion metrics 915 are calculated, the metrics can be communicated to congestion manager 930 by terminal 920, or communicated to terminal 920 from congestion manager 930. In cases in which congestion manager 930 determines in step 932 that a plurality of receivers (i.e., terminals or end users) should receive a network congestion update, congestion manager 930 may communicate congestion status 913 or congestion metrics 915 to receivers such as terminal 940 in step 951. In those instances in which terminal 940 receives congestion status 913, terminal 940 can calculate its congestion metrics in step 941.

In some embodiments, terminal 940 may provide congestion status or congestion metrics updates to congestion manager 930. In an example, in step 962, file segment 961 is delivered to terminal 940. File segment 961 can be used to measure the congestion status of the network having a bottleneck link. In some embodiments, terminal 940 receives file segment 961 and determines the network congestion status in step 942. The network congestion status 954 is then communicated to congestion manager 930 in step 955. At step 935, congestion manager 930 determines the receivers (i.e., terminals or end users) to receive network congestion status 954 as previously disclosed.

In some embodiments, the terminal 940 or congestion manager 930 can calculate congestion metrics 956 based on the congestion status 954 at steps 943 and 936, respectively. In some cases, congestion status values are weighted according to their age, which is in turn based on the time of the measurement. In other examples, averaging strategies can be employed to weight the most recent congestion status values, or to reduce congestion status measurement noise. An example of a weighting calculation, and exemplary calculations for congestion metrics, such as for example $R_{MAX}$ is previously disclosed herein.

In embodiments, after the congestion metrics 956 are calculated, the metrics can be communicated to congestion manager 930 by terminal 940, or communicated to terminal 940 from congestion manager 930. In cases in which congestion manager 930 determines in step 935 that a plurality of receivers (i.e., terminals or end users) should receive a network congestion update, congestion manager 930 may communicate congestion status 954 or congestion metrics 956 to receivers such as terminal 920 in step 917. In those instances in which terminal 920 receives congestion status 954, terminal 920 can calculate its congestion metrics in step 923.

Referring to FIG. 1, in an embodiment, congestion manager 930 is a base station 106*a*, 106*b*, 118, 120, 122 and terminals 920 and 940 are mobile devices or phones 108*a*-108*c* that are within a coverage area of the base station and are joined to the base station. The base station may be a macro base station, pico base station, femto base station, or the like. In an implementation, if the base station or a base station controller receives a congestion status from one of the mobile devices 108, the base station determines other mobile devices that are joined to the base station by accessing stored status records of the unique identifiers of currently attached (joined) mobile devices (e.g. attachment status known via mobility protocol exchanges between mobile devices and serving base station), and broadcasts congestion information to these other mobile devices. These other mobile devices then reduce their bandwidth requests to the base station. In another implementation, upon receiving a congestion status from one of the mobile devices that is joined to the base station, the base station sends congestion information to selected mobiles devices based on the current bandwidth being used or expected bandwidth usage of the these other mobile devices. The selected mobile devices adjust their bandwidth requests to the base station after the congestion information from the base station. These selected mobile devices are part of the mobile devices that within the coverage area and are joined to the base station.

While several embodiments of the present invention have been illustrated and described herein, many changes can be made without departing from the spirit and scope of the invention. For example, it can be appreciated that the disclosure may be used in wireless networks, wired networks, fiber networks and coaxial networks alone, or in combination. Accordingly, the scope of the invention is not limited by any disclosed embodiment. Instead, the scope of the invention should be determined from the appended claims that follow.

What is claimed is:

1. A networked system, comprising:
    a sending system having a processor and a memory,
    first and second mobile terminals, each mobile terminal having a processor and a memory; and
    a communication network having a plurality of network resources that couples the sending system and the first and second mobile terminals; and
    wherein the sending system sends a first file segment to the first mobile terminal, the first file segment being a portion of a first data file being transmitted to the first mobile terminal;
    wherein the first mobile terminal determines first congestion information of the communication network based on a transfer of the first file segment and determines a first transfer policy based on the first congestion information, wherein the first congestion information provides throughput data delivery measurements over one or more network segments or end-to-end link throughput performance measurements for combined network segments, or both, and wherein the first transfer policy provides a maximum permitted average delivery rate for the first mobile terminal based on the first congestion information determined by the first mobile terminal.

2. The networked system of claim 1, wherein the second mobiles terminal determines a second transfer policy based on second congestion information, the second congestion information being based on the first congestion information determined by the first mobile terminal, the second transfer policy providing a maximum permitted average delivery rate for the second mobile terminal based on the second congestion information, and wherein the second mobile terminal receives a second file segment from the sending system according to the second transfer policy.

3. The networked system of claim 2, wherein the first congestion information is measured by a resource that is associated with a lower communications layer, and wherein second congestion information is provided to the second mobile terminal via the communication network.

4. The networked system of claim 3, wherein the second congestion information is communicated to the second mobile terminal by providing information in an application layer of a packet transmitted to the second mobile terminal.

5. The networked system of claim 1, wherein the first congestion information includes congestion status.

6. The networked system of claim 5, wherein the congestion status information is measured by the first mobile terminal.

7. The networked system of claim 6, wherein the second congestion information is communicated to the second mobile terminal by providing information in an application layer of a packet transmitted to the second mobile terminal.

8. The networked system of claim 1, wherein the method further comprises:
determining a bottleneck link in the communication network based on the first congestion information, the bottleneck link being associated with one of the network resources in the end-to-end communication network links between the sending and the first mobile terminal;
identifying a mobile terminal sharing the bottleneck link, the identified mobile terminal being the second mobile terminal; and
communicating the second congestion information to the second mobile terminal.

9. The networked system of claim 8, wherein the sending system identifies the mobile terminal sharing the bottleneck link and communicates the second congestion information to the second mobile terminal.

10. The networked system of claim 1, wherein the first mobile terminal communicates the first congestion information to a congestion management system of the network system, and
wherein the congestion management system communicates the second congestion information to the second mobile terminal.

11. A congestion detection method in a networked system having a sending system and first and second mobile terminals, the method comprising:
determining first congestion information of a communication network by a first mobile terminal based on a transfer of a first file segment, the first file segment being a portion of a first data file being transmitted to the first mobile terminal by the sending system;
determining a first transfer policy by the first mobile terminal based on the first congestion information, the first transfer policy providing a maximum permitted average delivery rate for the first mobile terminal; and
receiving a second file segment of the first data file by the first mobile terminal according to the first transfer policy.

12. The method of claim 11, wherein the first congestion information provides throughput data delivery measurements over one or more network segments or end-to-end link throughput performance measurements for combined network segments, or both.

13. The method of claim 12, wherein the first congestion information is measured by a resource that is associated with a lower communications layer.

14. The method of claim 13, wherein second congestion information is communicated to the second mobile terminal by providing information in an application layer of a packet transmitted to the second mobile terminal.

15. The method of claim 11, wherein the first congestion information includes congestion status.

16. The method of claim 15, wherein the congestion status is measured by the first mobile terminal.

17. The method of claim 11, wherein the method further comprises:
determining a bottleneck link in the end-to-end network system links between the sending and one or more mobile terminals based on the first congestion information;
identifying a mobile terminal sharing the bottleneck link, the identified mobile terminal being the second mobile terminal;
communicating second congestion information to the second mobile terminal; and
determining a second transfer policy by the second mobile terminal based on the second congestion information, the second transfer policy providing a maximum permitted average delivery rate for the second mobile terminal.

18. A congestion detection method in a networked system having a sending system and a first mobile terminal, the method comprising:
sending a first file segment to the first mobile terminal by the sending system, the first file segment being a portion of a first data file being transmitted to the first mobile terminal by the sending system;
sending a second file segment to the first mobile terminal by the sending system according to a first transfer policy determined by the first mobile terminal, the first transfer policy providing a maximum permitted average delivery rate for the first mobile terminal,
wherein the first transfer policy is determined by the first mobile terminal based on first congestion information of a communication network, the first congestion information being based on a transfer of the first file segment as received by the first mobile terminal.

19. The method of claim 18, further comprising:
communicating second congestion information to a second mobile terminal; and
determining a second transfer policy by the second mobile terminal based on the second congestion information, the second transfer policy providing a maximum permitted average delivery rate for the second mobile terminal,
wherein the first congestion information is determined by the first mobile terminal.

* * * * *